May 5, 1931.　　　　G. D. SIMONDS　　　　1,804,121
MOTOR VEHICLE
Filed Nov. 21, 1927　　2 Sheets-Sheet 2

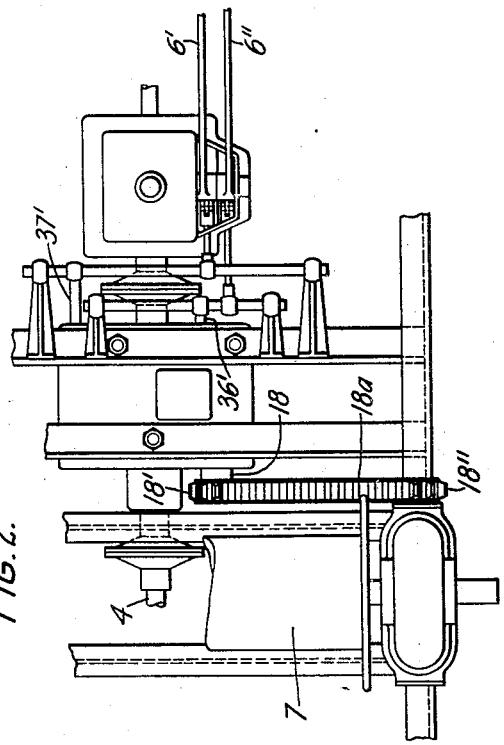
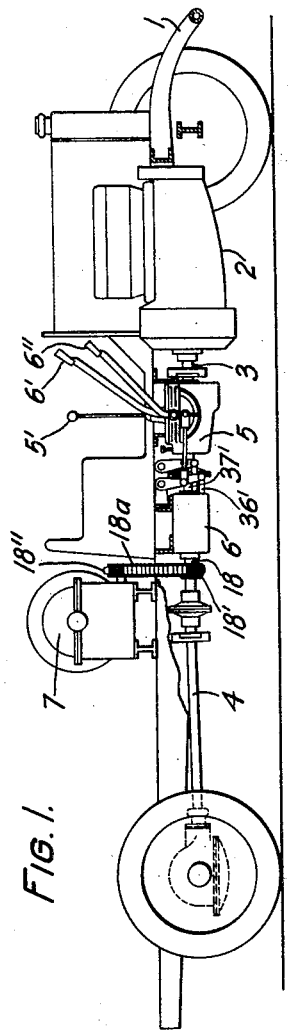

INVENTOR
GEORGE D. SIMONDS
By
ATTORNEY

Patented May 5, 1931

1,804,121

UNITED STATES PATENT OFFICE

GEORGE D. SIMONDS, OF NEWARK, NEW JERSEY, ASSIGNOR, BY MESNE ASSIGNMENTS, TO WESTERN ELECTRIC COMPANY, INCORPORATED, OF NEW YORK, N. Y., A CORPORATION OF NEW YORK

MOTOR VEHICLE

Application filed November 21, 1927. Serial No. 234,744.

This invention relates to motor vehicles and more particularly to gearing.

In commercial motor vehicles, for example, trucks, it is frequently desirable to drivingly connect auxiliary apparatus such as a winch, a crane, a capstan or the like to the engine without interfering with the normal operation of the vehicle. It has been the practice heretofore to provide power take-off means in the change speed gearing unit with the result that this unit is modified and cannot be used as a standard on motor vehicles requiring no power take-off means. It is also often desirable, when driving the auxiliary apparatus and the motor vehicle simultaneously, or when only driving the vehicle, to reduce the speed of the vehicle below that obtainable with change speed gearing having the customary gear ratios.

An object of this invention is to provide means for taking power from the propeller shaft of a motor vehicle and for reducing the speed of the motor vehicle below that obtainable with the usual change speed gears.

Another object is to provide a compact gearing unit adapted to be associated with a standard change speed transmission gearing unit on a motor vehicle.

Another object is to assemble or disassemble a change speed gear on a motor vehicle without modifying other gear elements thereof.

A further object is to combine a power take-off gearing unit with a change speed transmission unit whereby an additional reduction in speed of an associated motor vehicle may be secured and whereby power may be taken off for driving auxiliary apparatus.

A further object is to drive a power take-off gearing and an associated motor vehicle either independently or simultaneously.

A feature of the invention is a power take-off unit which may be associated with a standard change speed gear unit and which has a change speed gear that can be readily assembled or disassembled.

Another feature is a power take-off unit including driving and driven shafts adapted to be associated, respectively, with the corresponding shafts of a motor vehicle, and having a power take-off shaft and means for drivingly connecting the power take-off shaft to the driving shaft either independently of or in conjunction with a driving connection of said driven shaft to said driving shaft.

Broadly the invention comprises a standard change speed transmission unit and an associated power take-off gearing including a casing in which driving and driven shafts and a countershaft are positioned on suitable bearings. The casing has an opening at one side in registry with a corresponding opening in a removable case section carrying the countershaft and associated slidable gears and gear shifting mechanism adapted to drivingly interconnect the driving and driven shafts whereby the latter shaft is driven at a speed lower than that obtainable with a standard change speed gearing. A cover plate is provided to replace the removable case section. The power take-off gearing is assembled as a unit and includes a clutch by means of which the driving and driven shafts may be directly connected. It also includes a power take-off shaft and means for connecting this shaft to the driving shaft for either forward or reverse drive, either independently of, or in conjunction with movement of the motor vehicle.

Further features and objects of the invention will appear from the following description taken in connection with the accompanying drawings wherein;

Fig. 1 is a side elevation of the chassis of a motor vehicle embodying the power take-off device of this invention.

Fig. 2 is an enlarged view of the power take-off gear case, mounting and gear shift controls.

Figure 3:
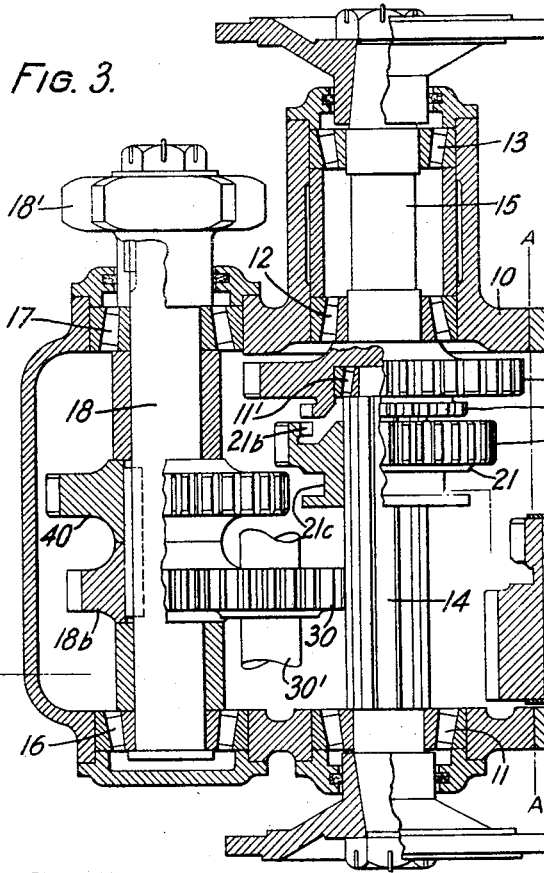
Fig. 3 is a view in section through the power take-off unit substantially on line 3—3 of Fig. 4.
Figure 4:
Fig. 4 shows a cover adapted to replace the removable case section.

The motor vehicle shown in Fig. 1 includes a frame having side frame members 1 adapted to support the engine 2 having a driving shaft 3 connected to a propeller shaft 4 by the usual change speed mechanism 5 and an associated power take-off mechanism 6. The power take-off mechanism includes a power take-off shaft 18 connected by sprockets 18' and 18'' and a suitable driving chain 18a to the driving shaft of a winch 7. The mechanisms 5 and 6 are provided with suitable control levers 5' and 6' and 6'' respectively for shifting the associated gears.

Although the unit 6 is shown placed between the change speed gearing 5 and the rear axle, it may be located in any other suitable position, for example, between the unit 5 and the engine 2. However, the arrangement illustrated is preferred, because in this location, the mechanism 5 is effective to change the speed of the winch as well as the speed of the motor vehicle.

The power take-off mechanism 6 is shown more in detail in Figs. 2, 3, 4 and 5. The elements of the vehicle other than the power take-off unit may be of any well known type. The winch may be of any suitable type, for example, like that shown in Patent No. 1,584,819 to T. C. Smith et al., May 18, 1926. The power take-off unit comprises a casing 10, including bearings 11, 12 and 13, Fig. 3, for supporting a driving shaft, 14, and a driven shaft, 15, respectively. The inner end of the shaft 14, is journaled in a bearing 11', provided in the inner end of the shaft 15. The casing 10, also includes bearings 16 and 17, adapted to support a power take-off shaft 18. The casing 10, includes in addition a removable section, 19, in which an auxiliary countershaft 20, is rigidly supported and retained by a key 35.

Figure 5:
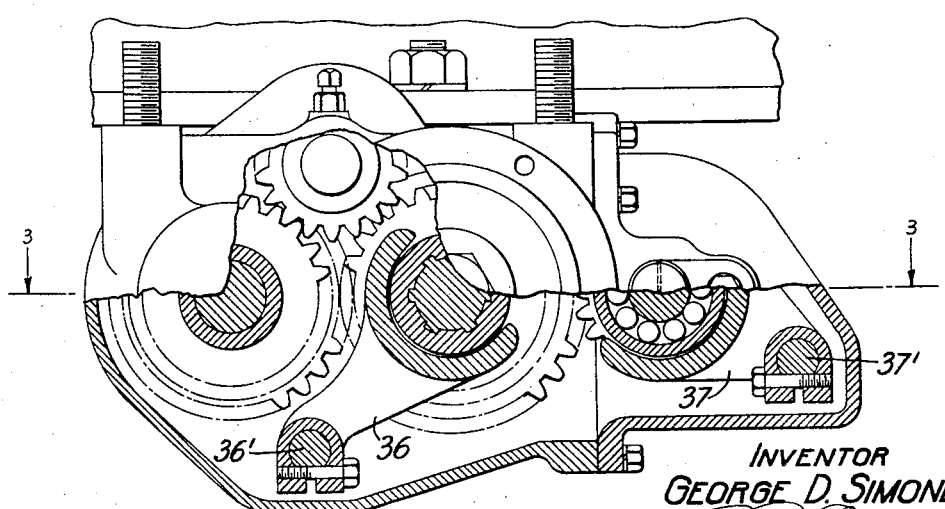
Fig. 5 is a view in side elevation partly in section on line 5—5 of Fig. 3.

A clutch element, 21, is splined to the shaft 14, and is adapted to slide transversely thereon and to rotate therewith. The element 21, includes an integral gear 21a, internal clutch teeth 21b and a groove 21c adapted to receive the prongs of an axially movable fork 36 (Fig. 5). The driven shaft 15, which is positioned in axial alignment with the driving shaft includes an integral gear 15a, and external clutch teeth 15b, adapted to mesh with the teeth 21b, of the element 21. The power take-off shaft 18, has drivingly connected thereto, within the casing 10, two gears 40 and 18b adapted to be engaged respectively by the gears 21a and 30. The gear 30 rotates idly on a shaft 30' except when engaged by the gear 21a for reversing the direction of rotation of the power take-off shaft. The sprocket 18' is attached to the shaft 18 external to the casing.

Rotatably mounted upon the countershaft 20, upon suitable bearings 20' and 20'', are integral gears 20a and 20b, which are adapted to engage the gears 15a and 21a respectively, whereby the shaft 14, may drive the shaft 15, at reduced speed.

The gears 20a and 20b have an annular groove 20c adapted to receive the prongs of an axially movable fork 37, (Fig. 5).

The forks 36 and 37 are connected by suitable means including rods 36' and 37', respectively, to the control levers 6' and 6'' whereby the gears of the power take-off unit may be shifted.

Since the power take-off unit 6 is connected in series with the transmission unit 5, between the propeller shaft 4, and the engine, the gears 20a and 20b, enable the speed of the motor vehicle to be reduced below that provided by the gears of the transmission unit 5 alone.

The gear 30 is normally in mesh with gear 18b and is adapted to be engaged by the gear 21a when the latter is adjusted to a suitable position along the shaft 14, by means of its associated control lever 6''.

The openings in the casing 10 through which the rotatable shafts 14, 15 and 18 extend, and through which the control rods 36' and 37', extend are provided with suitable oil tight packings, the casing being adapted to retain oil for the bearings and gears.

The sprocket, 18', is engaged by the chain 18a, which also passes over a sprocket attached to the driving shaft of the winch 7, as illustrated in Figs. 1 and 2.

The power take-off unit operates as follows: With the clutch 21 in the position shown, the driving and driven shafts are disengaged as is also the power take-off shaft. To connect the shafts 14 and 15 directly, the clutch element 21 is shifted by operating its associated lever 6'' until the teeth 21b engage the teeth 15b. In order to drive the shaft 15 at a speed lower than the speed of rotation of the shaft 14, for reducing the speed of the motor vehicle, the gears 20a, 20b are shifted by means of lever 6' and gear 21a is shifted by lever 6'' so that gear 20a meshes with gear 15a and gear 20b meshes with gear 21a. If it be desired to have the power take-off shaft remain stationary during movement of the vehicle, the gear 21a is shifted to a position between the gears 40 and 18b, and hence out of engagement therewith. On the other hand, if it be desired to simultaneously drive the winch and the motor vehicle, the gear 21a is caused to mesh with the gear 40 and simultaneously with the gear 20b. The gear 20b is made sufficiently wide so that with gears 20a and 15a in mesh the gear 21a may be shifted into or out of mesh with the gear 40 without becoming disengaged from the gear 20b.

To reverse the direction of rotation of the power take-off shaft, the gear, 21a, is shifted until it engages the idler gear, 30, which is normally in mesh with the gear 18b. During the reverse drive of the power take-off shaft, the motor vehicle is necessarily stationary because the gears 20a and 20b do not simultaneously engage the gears 21a and 15a.

The section 19 of the gear casing is removable from the portion 10, so that if desired, the duplex gear unit and its supporting shaft 20 may be omitted, without modification of the remainder of the power take-off unit. This accordingly simplifies the manufacture and assembly of the power take-off unit since a standard unit may be inserted in all of the motor vehicles to be manufactured whereas only those in which it is desired to have an additional reduction in speed need be supplied with the casing 19 and the additional gears 20a and 20b of the duplex gear unit. When the casing, 19, is omitted, an oil tight cover plate, 19a (see Fig. 4) is substituted therefor.

It will be readily understood that the power take-off shaft 18 may be driven at several speeds in a forward direction as determined by the setting or adjustment of the change speed gears contained in the casing, 5. In other words, while the gear 21a is in mesh with the gear 40, the change speed gears may be adjusted for first, second or third speed and accordingly the speed of the power take-off shaft will correspond to these various speeds. Likewise, with the clutch members 21a and 21b in engagement, the usual three speeds of the motor vehicle are secured by the transmission, 5, whereas if the gears 20a and 20b mesh with the gears 15a and 21a respectively, an additional reduction in speed corresponding to each separate adjustment of the change speed gears of the vehicle may be secured.

Although this invention has been described in connection with a specific embodiment, the principles involved are susceptible of numerous other applications that will readily occur to persons skilled in the art and the invention is therefore to be limited only as indicated by the scope of the appended claims.

What is claimed is:

1. In a gearing, a casing, aligned driving and driven shafts supported by said casing, a power take-off shaft, a countershaft mounted in said casing, a duplex gear unit carried by said countershaft and means including said unit for selectively driving said power take-off shaft either independently of or in conjunction with movement of said driven shaft, the movement of the driving and driven shafts being normally ineffective with respect to said power take-off shaft and said countershaft.

2. In a power transmitting mechanism, a driving shaft and a driven shaft, a gear carried by each of said shafts, means for directly connecting said shafts, a countershaft a duplex gear unit slidably mounted on said countershaft for engaging the respective gears for connecting said driving and driven shafts to obtain a speed ratio smaller than unity, and a power take-off shaft adapted to be connected to said driving shaft either in conjunction with or independently of connection of said driven shaft to said driving shaft, said means being normally ineffective to cause the operation of said power take-off shaft and counter-shaft.

3. In a gearing, a driven shaft, a gear mounted thereon a driving shaft, a gear splined to said driving shaft, a power take-off shaft, a gear mounted on said power take-off shaft, a countershaft having a duplex gear unit mounted thereon, the second mentioned gear being movably in engagement with the gear on the power take-off shaft and the duplex gear unit with the first and second mentioned gears for operatively connecting the power take-off shaft and the driven shaft to said driving shaft.

In witness whereof, I hereunto subscribe my name this 17th day of November, 1927.

GEORGE D. SIMONDS.